(12) United States Patent
Popp et al.

(10) Patent No.: US 7,957,869 B2
(45) Date of Patent: Jun. 7, 2011

(54) METHOD FOR OPERATING AN AUTOMATIC GEARBOX

(75) Inventors: Christian Popp, Kressbronn (DE); Klaus Steinhauser, Kressbronn (DE); Peter Schiele, Kresbronn (DE); Bernd Allgaier, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 497 days.

(21) Appl. No.: 12/225,624

(22) PCT Filed: Feb. 27, 2007

(86) PCT No.: PCT/EP2007/051836
§ 371 (c)(1),
(2), (4) Date: Sep. 26, 2008

(87) PCT Pub. No.: WO2007/113060
PCT Pub. Date: Oct. 11, 2007

(65) Prior Publication Data
US 2009/0112425 A1 Apr. 30, 2009

(30) Foreign Application Priority Data
Mar. 31, 2006 (DE) .......................... 10 2006 014 946

(51) Int. Cl.
*F16H 61/20* (2006.01)
*G06F 19/00* (2006.01)

(52) U.S. Cl. .............. 701/51; 701/59; 701/62; 477/107; 477/116

(58) Field of Classification Search ...................... 701/51, 701/59, 58, 62; 477/107, 158, 176, 116
See application file for complete search history.

(56) References Cited

U.S. PATENT DOCUMENTS

| | | | |
|---|---|---|---|
| 4,984,485 A * | 1/1991 | Kojima et al. | ................. 477/116 |
| 5,106,352 A | 4/1992 | Le Pelletier | |
| 5,134,903 A | 8/1992 | Itoh | |
| 5,194,056 A * | 3/1993 | Schiffhauer | ................... 475/325 |
| 5,361,651 A | 11/1994 | Wakahara | |
| 5,460,581 A | 10/1995 | Ueda | |
| 5,551,931 A * | 9/1996 | Matsumoto | ................... 477/149 |
| 5,827,153 A | 10/1998 | Yasue et al. | |
| 5,913,748 A | 6/1999 | Takiguchi | |
| 5,924,957 A | 7/1999 | Yasue et al. | |
| 6,183,393 B1 | 2/2001 | Habeck | |
| 6,375,597 B1 | 4/2002 | Popp et al. | |
| 7,029,413 B2 | 4/2006 | Sugawara et al. | |
| 7,134,538 B2 | 11/2006 | Hasegawa et al. | |
| 2004/0053734 A1 | 3/2004 | Raghavan et al. | |
| 2004/0087410 A1 | 5/2004 | Usoro et al. | |

(Continued)

FOREIGN PATENT DOCUMENTS
DE 41 21 774 A1 1/1992
(Continued)

*Primary Examiner* — Tan Q Nguyen
(74) *Attorney, Agent, or Firm* — Davis & Bujold, P.L.L.C.

(57) ABSTRACT

A method of operating an automatic transmission of a motor vehicle, in particular a variable-speed transmission. The automatic transmission includes at least five shift elements, at least three of which are engaged in a forward and a reverse gear to transfer torque or force. When disengaging gears for shifting the automatic transmission from a forward or reverse gear to a neutral position, at least one of the at least three shift elements that are engaged in the respective forward or reverse gear is completely disengaged.

8 Claims, 3 Drawing Sheets

U.S. PATENT DOCUMENTS

| | | |
|---|---|---|
| 2004/0132576 A1 | 7/2004 | Usoro et al. |
| 2006/0046892 A1 | 3/2006 | Bucknor et al. |

FOREIGN PATENT DOCUMENTS

| | | |
|---|---|---|
| DE | 43 34 172 A1 | 4/1994 |
| DE | 690 10 472 A1 | 3/1995 |
| DE | 196 49 442 A1 | 6/1997 |
| DE | 197 22 480 A1 | 12/1997 |
| DE | 197 25 513 A1 | 12/1998 |
| DE | 197 50 447 A11 | 6/1999 |
| DE | 100 43 510 A1 | 3/2002 |
| DE | 103 20 775 A1 | 12/2004 |
| DE | 10 2004 035 504 A1 | 2/2005 |
| DE | 10 2004 040 613 A1 | 3/2006 |
| DE | 10 2004 040 642 A1 | 3/2006 |
| DE | 10 2005 005 617 A1 | 3/2006 |
| EP | 0 564 016 A2 | 10/1993 |
| EP | 0 736 706 A2 | 10/1996 |
| EP | 1 416 194 A2 | 5/2004 |
| EP | 1 502 804 A2 | 2/2005 |
| FR | 2 855 583 | 12/2004 |
| WO | WO-2006/017905 A1 | 2/2006 |

* cited by examiner

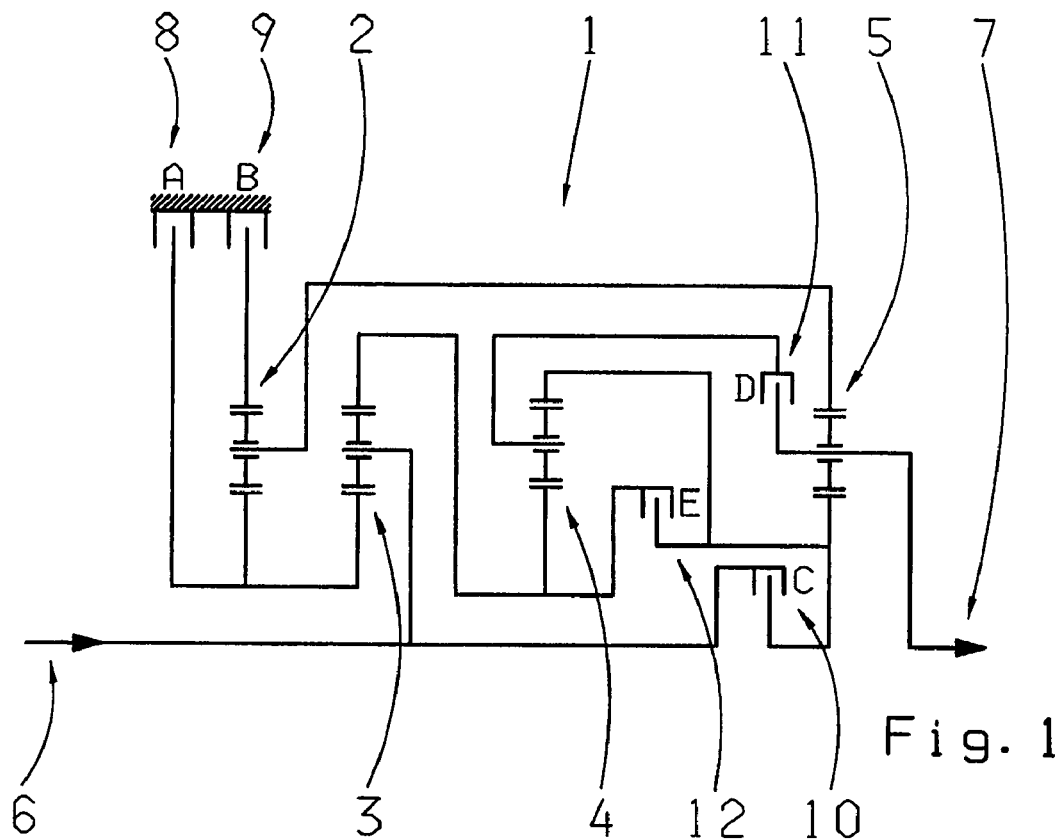

METHOD FOR OPERATING AN AUTOMATIC GEARBOX

This application is a national stage completion of PCT/EP2007/051836 filed Feb. 27, 2007, which claims priority from German Application Serial No. 10 2006 014 946.7 filed Mar. 31, 2006.

FIELD OF THE INVENTION

The invention concerns a method for operating an automatic transmission.

BACKGROUND OF THE INVENTION

Vehicles need transmissions in order to transform torques and speeds. The task of a vehicle transmission is to convert the traction force potential of a drive engine. The present invention concerns a method for operating an automatic transmission. In the context of this invention, the term automatic transmission should be understood to mean any transmission with an automatic gear change, also known as an automatic variable-speed transmission.

In the development of automatic transmissions a continual trend can be observed toward increasing the number of gears, particularly the forward gears of an automatic transmission. Thus at present, automatic transmissions with eight forward gears and one reverse gear are being developed. Such automatic transmissions have at least five shift elements, at least three of these at least five shift elements are engaged for torque transfer and force transfer in any forward gear and in a reverse gear. During gear disengagement out of a forward gear or a reverse gear in an automatic transmission of such type, the torque transfer and force transfer have to be interrupted in a safe and gentle manner. Until now, however, no methods for operating such automatic transmissions have been known which ensure safe and gentle gear disengagement in such automatic transmissions.

Against this background, the present invention addresses the problem of providing a new type of method for operating an automatic transmission.

SUMMARY OF THE INVENTION

With regard to a first embodiment of the present invention that problem is solved by a method for operating an automatic transmission herein. According to this, during the gear disengagement, in order to shift the automatic transmission from a forward or reverse gear to a neutral position, at least one of the shift elements that are engaged in the respective forward or reverse gear of the automatic transmission, is completely disengaged.

With regard to a second embodiment of the present invention, the problem is solved by the method for operating an automatic transmission herein. According to this, during the gear disengagement, a further shift element in the drive train is completely disengaged, whereas all the shift elements of the automatic transmission that are engaged in the respective forward or reverse gear, remain engaged.

BRIEF DESCRIPTION OF THE DRAWINGS

The invention will now be described, by way of example, with reference to the accompanying drawings in which:

FIG. 1 is a transmission layout of an automatic transmission with five shift elements, in which the method can be used advantageously according to the invention;

FIG. 2 is a shift element matrix for the shift elements of the transmission layout in FIG. 1, indicating which shift elements are engaged in which gear;

DETAILED DESCRIPTION OF THE INVENTION

Figure 4:
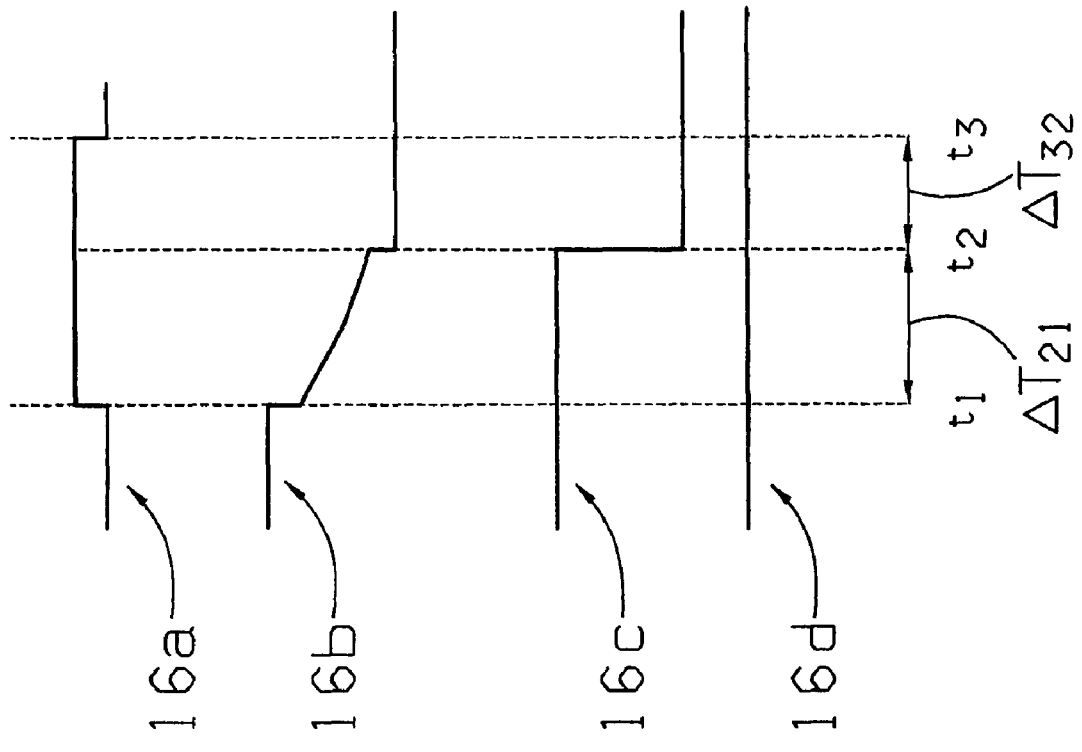
FIG. 4 is a sequence diagram for gear disengagement according to a second alternative of the first embodiment of the present invention.

The present invention concerns a method for operating an automatic transmission.

FIG. 1 shows a transmission layout 1 of a variable-speed transmission in which the method for operating an automatic transmission is preferably used. The automatic transmission of FIG. 1 has a total of four transmission gearsets 2, 3, 4 and 5 designed to convert a transmission input torque, applied to a transmission input 6, into a transmission output torque at a transmission output 7. The transmission gearsets 2, 3, 4 and 5 of the automatic transmission in FIG. 1 are made as planetary transmission gearsets.

As shown in the transmission layout 1 of FIG. 1, besides its four transmission gearsets 2 to 5, the automatic transmission also comprises a total of five shift elements 8, 9, 10, 11 and 12. The shift element 8 is denoted as shift element A; the shift element 9 denoted as shift element B; the shift element 10 denoted as shift element C; the shift element 11 denoted as shift element D, and the shift element 12 denoted as shift element E. The shift elements A and B are both brakes whereas the shift elements C, D and E are all clutches. The shift elements 8 to 12 are shift elements of the known transmission gearset system.

In the automatic transmission, represented schematically in FIG. 1, comprising the five shift elements 8 to 12 or A to E, application of the shift matrix 14, shown in FIG. 2, can produce eight forward gears and one reverse gear.

The eight forward gears "1" to "8" and the reverse gear "R" are entered down the left-hand column of the shift matrix 14, and the shift elements A to E along its top row. Shift elements marked with a spot in the shift element matrix 14 are engaged in the respective gear. It can be seen that in each case three of the five shift elements are engaged for each forward gear and for the reverse gear as, for example, the shift elements A, B and C for forward gear "1" and shift elements A, B and D for the reverse gear "R". In contrast, the respective other shift elements are fully disengaged.

Thus, for the transfer of force or torque from the transmission input 6 to the transmission output 7 in the automatic transmission shown in FIG. 1, in each gear three shift elements are fully engaged while two shift elements are fully disengaged.

The present invention now provides a method for operating an automatic transmission of this type such that, during gear disengagement from a forward or a reverse gear to the neutral position of the automatic transmission, the torque or force transfer is interrupted safely and gently.

With regard to a first embodiment of the present invention, to disengage a gear from a forward or reverse gear to the neutral position, at least one of the shift elements of the automatic transmission that is engaged in the respective forward or reverse gear is disengaged completely. To do this, there are four alternative ways, which will be explained in detail below with reference to FIGS. 3 to 6.

Figure 3:
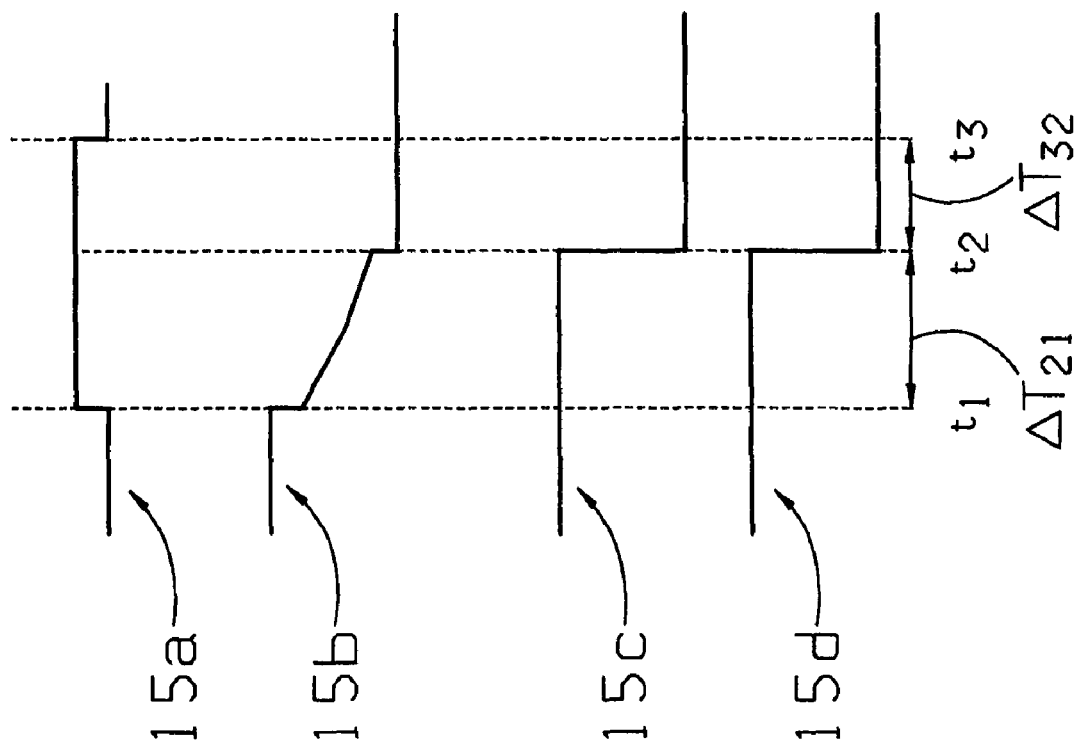
FIG. 3 is a sequence diagram for gear disengagement according to a first alternative of a first embodiment of the present invention.

A first alternative of the first embodiment of the present invention in which, for gear disengagement, at least one of the shift elements of the automatic transmission that is engaged in the respective forward or reverse gear is fully disengaged, is described with reference to FIG. 3, in which a total of four signal-versus-time patters 15a, 15b, 15c and 15d are shown. The signal-time pattern 15a visualizes a shift demand in the sense of gear disengagement; the signal pulse at time $t_1$ expressing the demand to disengage a previously engaged forward or reverse gear and shift to the neutral position. As can be seen from signal patterns 15b, 15c and 15d, up to the said time $t_1$, three shift elements are fully engaged in the corresponding forward or reverse gear. The signal-time patterns 15b, 15c and 15d illustrate the subsequent actuation or behavior of the shift elements of the automatic transmission that are engaged in the respective forward or reverse gear.

According to the first alternative of the first embodiment of the present invention, when a gear disengagement is called for at time $t_1$ signal pattern 15b shows that a first one of the shift elements engaged in the forward or reverse gear is partially disengaged or changed to a partially filled condition in a controlled manner within a first time interval $\Delta T_2$, defined by the time points $t_2$ and $t_1$, and this in such manner that time $t_2$ the first shift element is transmitting no or nearly no torque so that the torque and force transfer of the automatic transmission is interrupted at time $t_2$.

In an immediately succeeding time interval $T_{32}$ defined by the time points $t_3$ and $t_2$, according to the first alternative of the first embodiment of the present invention, the signal pattern 15b shows that the first shift element is completely disengaged.

Furthermore, according to the first alternative of the first embodiment of the present invention, in the second time interval $\Delta T_{32}$, the signal patterns 15c and 15d show that a second and a third of the shift elements engaged in the forward or reverse gear are also fully disengaged.

The complete disengagement of the shift elements at time $t_2$, when the force and torque transfer of the automatic transmission have already been interrupted, preferably takes place in steps.

According to this first alternative of the first embodiment of the present invention, for a gear disengagement, all three of the shift elements engaged in the respective forward or reverse gear are completely disengaged, a first shift element is partially disengaged in a controlled manner until the torque and force transfer of the automatic transmission is interrupted and, thereafter, in a second time interval, all three shift elements are completely disengaged in steps.

This first alternative of the first embodiment of the present invention is used above all when, in the neutral position, value is placed on security against multiple errors when a hydraulic holding function, for example the onset of emergency running, would lead to the engagement of a drive position or when this is made necessary for reasons to do with transmission mechanics, for example because of an internal speed situation.

In the example embodiment illustrated, the first alternative of the first embodiment of the present invention is applied when, starting from forward gear "6", the automatic transmission has to be shifted to the neutral position.

A second alternative of the first embodiment of the present invention is described below with reference to FIG. 4, which again shows four signal-time patters 16a, 16b, 16c and 16d.

The signal pattern 16a corresponds to a shift demand in the sense of a gear disengagement, while signal patterns 16b, 16c and 16d show the behavior or actuation of the three shift elements that are engaged in the respective forward or reverse gear.

According to the second alternative of the first embodiment of the present invention, when a shift demand in the sense of a gear disengagement has been made at time $t_1$, again a first shift element is partially disengaged or changed to a partially filled condition in a controlled manner during a first time interval $\Delta T_{21}$ as represented by the signal-time pattern 16b so that at time $t_2$, this first shift element is transferring no or almost no torque and the torque and force transfer of the automatic transmission has been interrupted at time $t_2$. In the subsequent, second time interval $\Delta T_{32}$, the first shift element is completely disengaged, as shown by the signal-time variation 16b. In addition, as shown by the signal-time variation 16c, a second one of the shift elements engaged in the forward or reverse gear is fully disengaged during the second time interval $\Delta T_{32}$, while in contrast, a third one of the shift elements, engaged in the forward or reverse gear, remains engaged as shown by signal pattern 16d.

Accordingly, in the second alternative of the first embodiment of the present invention, when a gear disconnection has taken place, two of the three shift elements previously engaged in the forward or reverse gear are completely disengaged and in contrast a third one of these previously engaged shift elements remains engaged.

This second alternative of the first embodiment of the present invention is preferably used when, in the neutral position, security against simple errors must be ensured while, at the same time, the reaction time in a subsequent gear engagement is sufficient.

In the example embodiment illustrated, the second alternative of the first aspect of the present invention is used when, starting from forward gear "3" or "4" or "5" or "7" or "8", the automatic transmission has been shifted to the neutral position.

A third alternative of the first embodiment of the invention is illustrated in FIG. 5, which again shows four signal-time patters, namely the signal pattern 17a that represents a shift demand in the sense of a gear disengagement at time $t_1$ and the signal patterns 17b, 17c and 17d, which represent the control or behavior of the three shift elements that are engaged in the forward or reverse gear.

Figure 5:
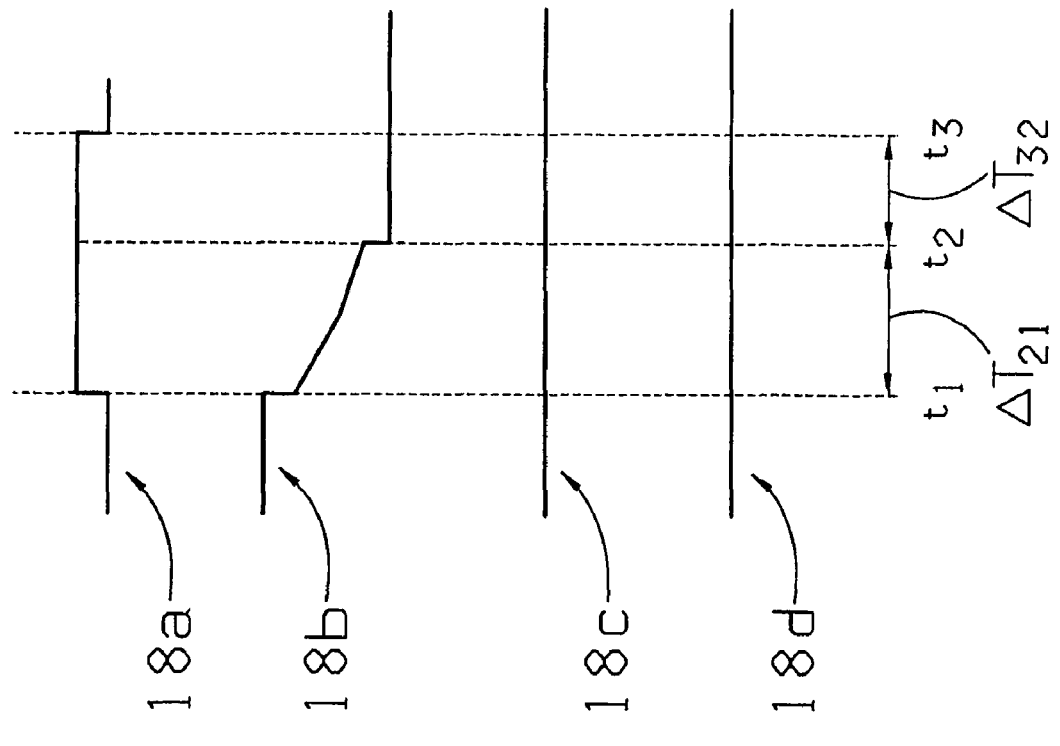
FIG. 5 is a sequence diagram for gear disengagement according to a third alternative of the first embodiment of the present invention.
Figure 6:
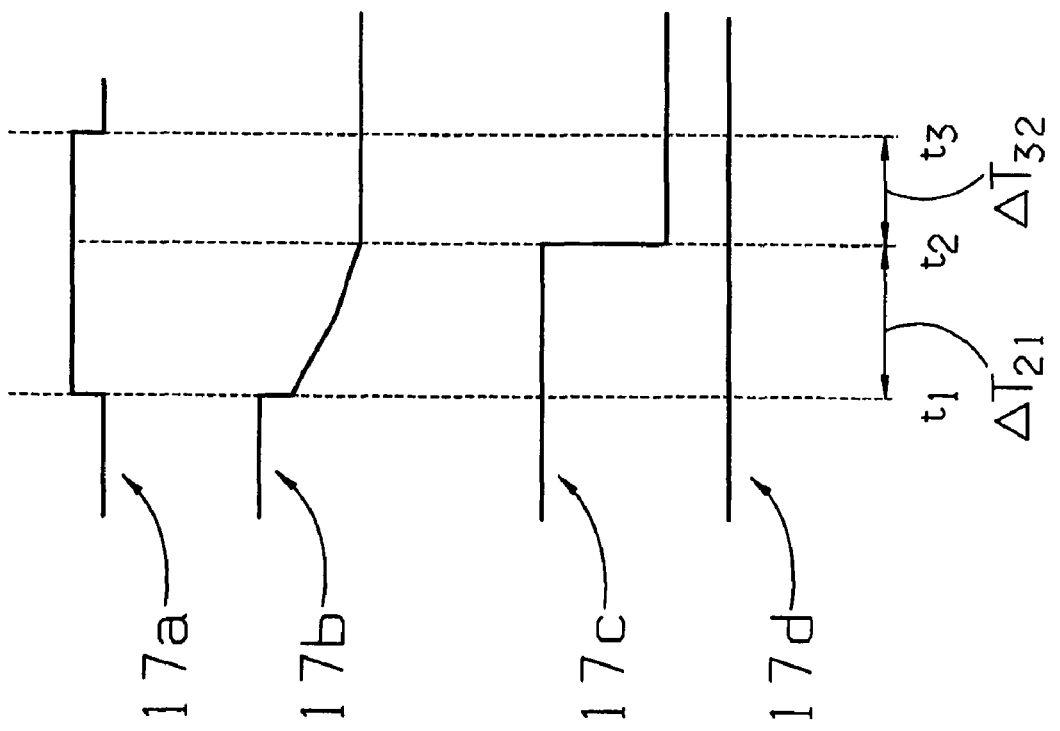
FIG. 6 is a sequence diagram for gear disengagement according to a fourth alternative of the first embodiment of the present invention.

According to FIG. 5, in the third alternative of the first embodiment, in accordance with the signal pattern 17b, when a gear disengagement has been called for at time $t_1$ signal pattern 17b again shows that a first shift element is partially disengaged or changed to a partially filled condition in a controlled manner during a first time interval $\Delta T_{21}$ so that, at time $t_2$, it transmits no or nearly no torque and the torque or force transfer by the automatic transmission has therefore been interrupted.

In the subsequent, second time interval $\Delta T_{32}$, as shown by the signal pattern 17b, this first shift element remains partially disengaged, in contrast a second one of the shift elements engaged in the forward or reverse gear is fully disengaged at time $t_2$ as shown by signal pattern 17c and a third shift element remains engaged as shown by signal pattern 17d. In accordance with signal variation 17c, the opening of the second shift element at time $t_2$ takes place stepwise, namely not until the torque or force transfer of the automatic transmission has been interrupted at time $t_2$ by the prior, controlled partial disengagement of the first shift element as shown by signal pattern 17b.

The third alternative of the first embodiment of the present invention is preferably used when, in the neutral position, sufficient security against simple errors must be ensured, which at least means that the vehicle cannot roll along and, at the same time, there must be a good reaction time for a subsequent gear engagement.

In the example embodiment illustrated, the third alternative of the first embodiment of the present invention is used when, starting from forward gears "1" or "2" or from the reverse gear "R", the automatic transmission has to be shifted to the neutral position in the sense of a gear disengagement.

As explained above, the above three alternatives of the first embodiment of the present invention are preferably used in combination with one another for operating an automatic transmission, depending on the gear from which the automatic transmission is shifted to the neutral position.

Thus, for neutral positions from which as a matter of course a gear is engaged, that alternative (the third alternative) is chosen which gives the best reaction time. For other neutral positions in which, as a matter of course, a gear is engaged only while driving, that alternative (the second alternative) is chosen which places the greatest weight on safety, since reaction time is then not so critical. If there are hydraulic reasons or ones related to the transmission mechanics, which do not allow a shift element to be kept engaged, then the first alternative is chosen.

A fourth alternative of the first embodiment of the present invention is illustrated in FIG. 6, which again shows four signal patterns 18a, 18b, 18c and 18d. The signal pattern 18a that represents a shift demand in the sense of a gear disengagement at time $t_1$ and the signal patterns 18b, 18c and 18d represent the behavior or control of the three shift elements that are engaged in the respective forward or reverse gear.

According to this fourth alternative of the first embodiment of the present invention, when the shift demand for gear disengagement is made at time $t_1$, a first one of the shift elements, engaged in the forward or reverse gear, is partially disengaged or changed to a partially filled condition in a controlled manner, as shown by signal pattern 18b during the first time interval $\Delta T_{21}$, so that at time $t_2$, the shift element is transferring no or nearly no torque and the torque or force transfer of the automatic transmission is again interrupted at time $t_2$. Thereafter, in the subsequent, second time interval $\Delta T_{32}$ the first shift element is fully disengaged as shown by signal pattern 18b, namely stepwise. As shown by the signal patterns 18c and 18d, a second and a third of the shift elements engaged in the forward or reverse gear remain engaged during the gear disengagement.

Common to all four alternatives of the first embodiment of the present invention is that when a gear disengagement is called for, a first one of the shift elements engaged in the respective forward or reverse gear is disengaged in a controlled manner.

Also common to all four variations is that at least one of the shift elements, engaged in the forward or reverse gear, is fully disengaged when the gear disengagement has taken place.

According to a second embodiment of the invention, to carry out a gear disengagement in an automatic transmission, a further shift element in the drive train is fully disengaged, whereas all the shift elements that are engaged in the respective forward or reverse gear of the automatic transmission remain engaged. For this, it is necessary for a further shift element in the drive train to be positioned upstream from the automatic transmission, for example a starting element, and such external starting elements, for example in parallel hybrid systems in which an electric motor and a combustion engine both act upon an automatic transmission, are positioned upstream from the automatic transmission.

The alternatives of the first embodiment of the invention for controlling the shift elements can be combined with this second embodiment for controlling the further shift element in accordance with the second embodiment of the invention.

Although with reference to FIGS. 1 and 2, the invention has been described for the preferred application case of an automatic transmission with five shift elements, three of which at a time are engaged in any forward gear and in a reverse gear, it should be made clear at this point that the invention can also be used with automatic transmissions having a larger number of shift elements, and certainly also when a larger number of shift elements are engaged in any gear. In such cases, the number of disengaged or partially filled shift elements is adapted to the systems in question and the additional shift elements are kept engaged so that, compared with the method described above, only the number of engaged shift elements is different.

Finally, let it be said that the shift elements A to E or 8 to 12 controlled in accordance with the first embodiment of the invention can also be referred to as shift elements internal to the transmission or internal to the transmission gearset system, whereas the further shift element in the drive train, which is relevant for the second embodiment of the invention, can be referred to as the shift element external to the transmission or external to the transmission gearset system.

REFERENCE NUMERALS 1 transmission layout
2 transmission gearset
3 transmission gearset
4 transmission gearset
5 transmission gearset
6 transmission input
7 transmission output
8 shift element A
9 shift element B
10 shift element C
11 shift element D
12 shift element E
14 shift element matrix
15a pattern
15b pattern
15c pattern
15d pattern
16a pattern
16b pattern
16c pattern
16d pattern
17a pattern
17b pattern
17c pattern
17d pattern
18a pattern
18b pattern
18c pattern
18d pattern

The invention claimed is:

1. A method of operating an automatic transmission of a motor vehicle, the automatic transmission comprising at least five shift elements, at least three of which are engaged in each of a forward gear and a reverse gear to transfer one of torque or force, in disengaging a gear for shifting the automatic transmission from a forward gear or a reverse gear to a neutral position at least one of the at least three shift elements that are engaged in the respective forward gear or the reverse gear is completely disengaged, the method comprising the steps of:

disengaging a first shift element of the at least three shift elements that are engaged in the respective forward gear or the reverse gear, out of all of the shift elements that are to be disengaged in the gear disengagement;

one of partially disengaging and partially filling the first shift element in a controlled manner in a first time interval, such that the first shift element transfers essentially no torque and the transfer of the torque or the force of the automatic transmission is interrupted;

completely disengaging the first shift element in a subsequent, second time interval following the first time interval, starting from the partially disengaged condition of the first shift element; and completely disengaging a second shift element and a third shift element of the at least three shift elements that are engaged in the respective forward gear or the reverse gear during the second time interval.

2. The method according to claims 1, further comprising the step of completely disengaging the second shift element and the third shift element of the at least three shift elements, that are engaged in the respective forward gear or the reverse gear during the second time interval, in a stepwise manner.

3. The method according to any of claims 1, further comprising the step of providing the automatic transmission with exactly five shift elements, three of which are which are engaged in each of the forward gears and the reverse gear.

4. The method according to claims 1, further comprising the step of disengaging the first shift element in the second time interval in a stepwise manner.

5. A method of operating an automatic transmission of a motor vehicle, the automatic transmission comprising at least five shift elements, at least three of which are engaged in each of a forward gear and a reverse gear to transfer one of torque or force, in disengaging a gear for shifting the automatic transmission from a forward gear or a reverse gear to a neutral position at least one of the at least three shift elements that are engaged in the respective forward gear or the reverse gear is completely disengaged, the method comprising the steps of:

disengaging a first shift element of the at least three shift elements that are engaged in the respective forward gear or the reverse gear, out of all of the shift elements that are to be disengaged in the gear disengagement;

one of partially disengaging and partially filling the first shift element in a controlled manner in a first time interval, such that the first shift element transfers essentially no torque and the transfer of the torque or the force of the automatic transmission is interrupted;

completely disengaging the first shift element in a subsequent, second time interval following the first time interval, starting from the partially disengaged condition of the first shift element;

completely disengaging a second shift element of the at least three shift elements, that are engaged in the respective forward gear or the reverse gear, during the second time interval; and maintaining engagement of a third shift element of the at least three shift elements, that are engaged in the respective forward gear or the reverse gear, during the second time interval.

6. A method of operating an automatic transmission of a motor vehicle, the automatic transmission comprising at least five shift elements, at least three of which are engaged in each of a forward gear and a reverse gear to transfer one of torque or force, in disengaging a gear for shifting the automatic transmission from a forward gear or a reverse gear to a neutral position at least one of the at least three shift elements that are engaged in the respective forward gear or the reverse gear is completely disengaged, the method comprising the steps of:

disengaging a first shift element of the at least three shift elements that are engaged in the respective forward gear or the reverse gear, out of all of the shift elements that are to be disengaged in the gear disengagement;

one of partially disengaging and partially filling the first shift element in a controlled manner in a first time interval, such that the first shift element transfers essentially no torque and the transfer of the torque or the force of the automatic transmission is interrupted; and maintaining one of the partial disengagement and partially filling of the first shift element during a subsequent second time interval, which follows the first time interval, completely disengaging a second shift element of the at least three shift elements that are engaged in the respective forward gear or the reverse gear, and maintaining engagement of a third shift element of the at least three shift elements that are engaged in the respective forward gear or the reverse gear.

7. A method of operating an automatic transmission of a motor vehicle, the automatic transmission comprising at least five shift elements, at least three of which are engaged in each of a forward gear and a reverse gear to transfer one of torque or force, the automatic transmission further comprising a further shift element, which is one of located upstream or downstream from the automatic transmission in a drive train and is engaged to transfer one of torque or force in the respective forward gear or the reverse gear, the method comprising the steps of:

completely disengaging the further shift element when disengaging a gear, and maintaining engagement of the at least three shift elements which are engaged in the respective forward gear and the reverse gear.

8. A method of operating an automatic transmission of a motor vehicle, the automatic transmission comprising at least five shift elements, at least three of which are engaged in each of a forward gear and a reverse gear to transfer one of torque or force, in disengaging a gear for shifting the automatic transmission from a forward gear or a reverse gear to a neutral position at least one of the at least three shift elements that are engaged in the respective forward gear or the reverse gear is completely disengaged, the method comprising the steps of:

disengaging a first shift element of the at least three shift elements that are engaged in the respective forward gear or the reverse gear, out of all of the shift elements that are to be disengaged in the gear disengagement;

one of partially disengaging and partially filling the first shift element in a controlled manner in a first time interval, such that the first shift element transfers essentially no torque and the transfer of the torque or the force of the automatic transmission is interrupted;

completely disengaging the first shift element in a subsequent, second time interval starting from the partially disengaged condition of the first shift element; and maintaining engagement of a second shift element and a third shift element of the at least three shift elements, that are engaged in the respective forward gear or the reverse gear, during the second time interval.

* * * * *